United States Patent
Sueki

(10) Patent No.: US 6,788,275 B1
(45) Date of Patent: Sep. 7, 2004

(54) METHOD AND APPARATUS TO ENHANCE VIEWABLE VIDEO CONTENT TO PROVIDE DEPTH OF FIELD AND THREE-DIMENSIONAL EFFECT

(75) Inventor: Thomas Jack Sueki, San Jose, CA (US)

(73) Assignee: InTeleMax, Inc., San Jose, CA (US)

(*) Notice: Subject to any disclaimer, the term of this patent is extended or adjusted under 35 U.S.C. 154(b) by 183 days.

(21) Appl. No.: 10/136,648

(22) Filed: May 1, 2002

Related U.S. Application Data

(60) Provisional application No. 60/288,401, filed on May 3, 2001.

(51) Int. Cl.[7] .......................... G09G 3/00; G06T 15/00; G03B 21/60
(52) U.S. Cl. .......................... 345/32; 345/419; 359/458
(58) Field of Search .................. 345/32, 419; 359/451, 359/478, 457, 742, 458; 348/832; 352/86

(56) References Cited

U.S. PATENT DOCUMENTS

| | | | | |
|---|---|---|---|---|
| 4,309,074 A | * | 1/1982 | Granieri, Jr. ................ | 359/478 |
| 4,414,565 A | * | 11/1983 | Shanks ........................ | 348/44 |
| 5,061,052 A | * | 10/1991 | DeJesus ...................... | 359/742 |
| 5,400,177 A | * | 3/1995 | Petitto et al. ................ | 359/451 |
| 6,177,966 B1 | * | 1/2001 | Masuda et al. ............. | 359/458 |
| 6,353,508 B1 | * | 3/2002 | Burke ......................... | 359/742 |
| 6,614,426 B1 | * | 9/2003 | Kakeya ....................... | 345/419 |
| 6,714,173 B2 | * | 3/2004 | Shinoura ..................... | 345/32 |

* cited by examiner

Primary Examiner—Chanh Nguyen
Assistant Examiner—Paul A. Bell
(74) Attorney, Agent, or Firm—Kevin Roe

(57) ABSTRACT

A method and an apparatus to enhance viewable video content from a luminous display generator to provide a depth of field and substantially a three-dimensional effect on viewable video content of a two-dimensional format. The apparatus may be packaged in a consumer format similar to a modern television unit with a cathode ray tube, and in other technical formats, such as, a plasma display, liquid crystal display, or other flat-panel displays. The optics of the apparatus includes a Fresnel lens applied directly in front of the luminous display generator at a lens application distance calculated from the physical dimensions and (optionally) the radius of curvature of the display surface of the luminous display generator.

3 Claims, 8 Drawing Sheets

METHOD AND APPARATUS TO ENHANCE VIEWABLE VIDEO CONTENT TO PROVIDE DEPTH OF FIELD AND THREE-DIMENSIONAL EFFECT

CROSS-REFERENCE TO RELATED APPLICATIONS

This application relates to and claims priority from U.S. Provisional Patent Application Serial No. 60/288,401, entitled "Method and Apparatus for Enhancing Viewable Video Content to Provide Depth of Field and Three-Dimensional Effect," filed on May 3, 2001, which is hereby incorporated by reference.

BACKGROUND OF THE INVENTION

The present invention relates generally to video displays, and more particularly, to a method and an apparatus for enhancing viewable video content from a luminous display generator to provide depth of field and three-dimensional effect.

Optical systems that produce three-dimensional video content and systems that project images into free space are known and available in various industries. However, many processes and specialized equipment are typically utilized to produce such effects. In one such three-dimensional system, multiple camera productions and editing are utilized to achieve three-dimensional video content. To view this commercial format, a special eyeglass is typically required. Because of the complicated production and editing process, the three-dimensional video content is typically not available in real time. Other three-dimensional systems typically utilize laser technologies that are complex, expensive to fabricate, and not practical for most consumers.

Systems to project three-dimensional images that appear to float in free space with images that are viewable in a single direction are also known. Such systems capable of projecting thee-dimensional images typically utilize a series of optical lenses, video graphic peripherals, and software to create these three-dimensional viewing environments.

Producing viewable optical images in free space of an object with apparatus including parabolic or spherical mirrors is also known in the prior art. However, the object typically must be precisely located with respect to the focal point of mirror, and the object and image produced must be stationary with respect to the apparatus.

As can be seen, an apparatus that can produce a depth of field and a three-dimensional effect without utilizing complicated equipment and processes is highly desirable. It is also desirable that the generated video content can be viewed without complicated equipment.

SUMMARY OF THE INVENTION

Preferred embodiments of the invention provide an apparatus capable of producing a depth of field and a three-dimensional effect utilizing a single Fresnel lens, while requiring no additional equipment for viewing.

A first aspect of the invention is directed to an apparatus to produce a substantially three-dimensional effect on viewable video content. The apparatus includes a luminous display generator having a display surface, configured to provide a viewable video content on the display surface; and a Fresnel lens having an inner surface and an outer surface, the Fresnel lens positioned at a lens application distance from the display surface of the luminous display generator, wherein the Fresnel lens is dimensioned and positioned at the lens application distance solely sufficient to provide a substantially three-dimensional effect on the viewable video content provided on the display surface of the luminous display generator.

A second aspect of the invention is directed to a method to implement a visual display system to provide a substantially three-dimensional effect on viewable video content. The method includes generating a viewable video content on a display surface of a luminous display generator, and positioning a Fresnel lens having an outer surface and an inner surface, with a lens application distance between the inner surface of the Fresnel lens and the display surface solely sufficient to provide a substantially three-dimensional effect on the viewable video content.

A third aspect of the invention is directed to a method to implement a visual display system to provide a substantially three-dimensional effect on viewable video content. The method includes generating a two dimensional viewable video content on a display surface of a luminous display generator; positioning a Fresnel lens having an outer surface and an inner surface, with a lens application distance between the inner surface of the Fresnel lens and the display surface, wherein the lens application distance between the inner surface of the Fresnel lens and the display surface of the luminous display generator is related to a physical dimension of the display surface; and said Fresnel lens and said lens application distance alone provide a substantially three-dimensional effect on the viewable video content. Fresnel lens and the display surface of the luminous display generator is related to a physical dimension of the display surface; and magnifying the two-dimensional viewable video content with the Fresnel lens to provide an enhanced viewable video content.

Various other aspects, alternative embodiments, and alternative features of the invention are described in further detail below.

The foregoing, together with other aspects of this invention, will become more apparent when referring to the following specification, claims, and accompanying drawings.

DESCRIPTION OF THE SPECIFIC EMBODIMENTS

Figure 1:
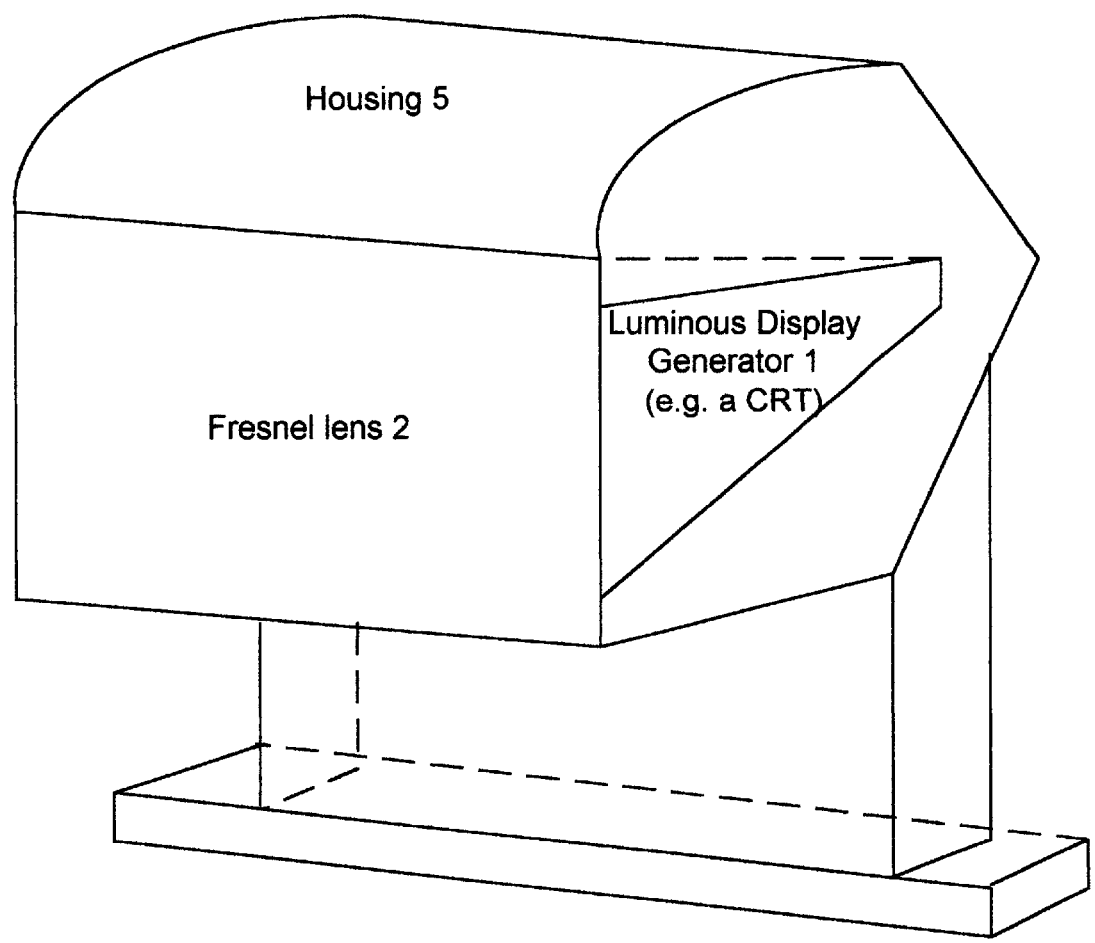
FIG. 1 is a diagram of an apparatus utilizing a luminous display generator, in this case a cathode ray tube (CRT), in accordance with one embodiment of the invention.

FIG. 1 is a diagram of an apparatus utilizing a luminous display generator 1, in this case a cathode ray tube (CRT), in accordance with one embodiment of the invention. In this embodiment, the apparatus is housed in an injection-molded plastic housing 5 resembling a typical television or CRT monitor unit. The internal feature includes: a cathode ray tube 1, a controller printed circuit board (not shown), and a Fresnel lens 2. The apparatus is viewed in similar manner as a modern television or a CRT monitor.

A Fresnel lens 2 is relatively inexpensive to fabricate, and may be designed for volume manufacturing for the consumer industry. One preferred embodiment of the invention utilizes a single Fresnel lens 2 applied directly in front of a luminous display generator 1. Both the luminous display generator 1 and Fresnel lens 2 may be designed and enclosed within a housing 5 (e.g., a molded housing) similar to modern television units. The housing 5 may be manufactured with molded plastic (e.g., injection-molded plastic) having non-reflective flat textures and a cosmetic texture on the exterior for appearance.

A Fresnel lens 2 is positioned at a lens application distance from the display surface of a luminous display generator 1. The lens application distance is related to the physical dimensions and radius of curvature of the display surface of the luminous display generator 1. In one embodiment, the lens application distance can be approximated by a physical dimension, such as a diagonal measurement, of the display surface of the luminous display generator 1, divided by 3.38. However, this simple approximation is not a precise calculation, and other calculations of the lens application distance can be applied to other embodiments of the invention. The combined characterization of the magnification and light saturation from the Fresnel lens 2 and the lens application distance of the Fresnel lens 2 from the display surface of the luminous display generator 1 create a greater depth of field and a three-dimensional effect in the viewable video content. The lens application distance is less than the focal length of the Fresnel lens 2 in order to achieve these effects.

The Fresnel lens 2 may be manufactured by several techniques (e.g., injection molding, or other types of molding, grinding, or an equivalent technique) and made from several optical materials, such as glass, or a plastic or polymer (e.g., acrylic resin, polyvinyl, polycarbonate, or equivalents). One embodiment may use a Fresnel lens 2 made of an acrylic resin having a refraction factor of 1.492 and a transmission factor of 92%. The Fresnel lens 2 lens application distance (and focal length) and pitch (i.e., the cross-sectional angularity of the Fresnel lens grooves) typically increase as the physical dimensions of the luminous display generator 1 increases. In one embodiment, for improved viewing results, the inner surface of the Fresnel lens 2 is matched to the display surface of the luminous display generator 1. Therefore, if the display surface of the luminous display generator 1 is curved (e.g., such as for a cathode ray tube 1 shown in FIG. 2), the radius of curvature of the inner surface of the Fresnel lens 2 is designed and shaped to substantially match the radius of curvature of the display surface of the luminous display generator 1.

Figure 2:
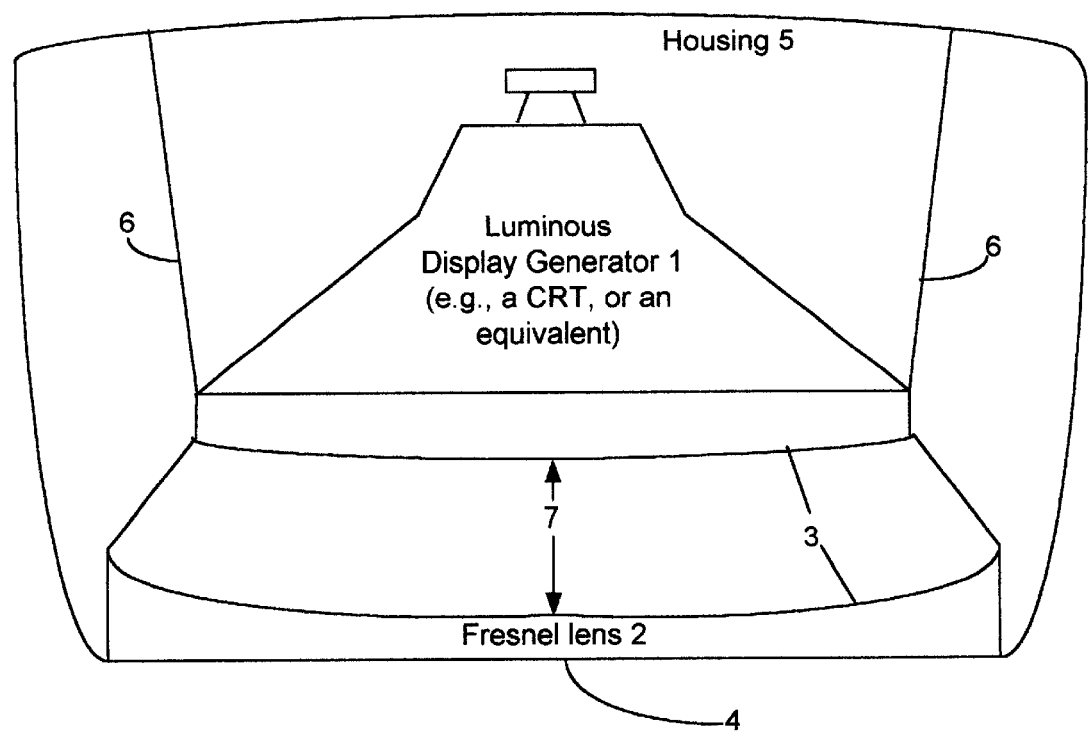
FIG. 2 is a perpendicular top view exposing internal features of the apparatus shown in FIG. 1.

FIG. 2 is a diagram illustrating a perpendicular top view exposing internal features of the apparatus shown in FIG. 1. In this embodiment, the luminous display generator 1 is a cathode ray tube, and is mounted into a television housing 5 and secured by internal walls 6. Television housing 5 has a design configuration so that a Fresnel lens 2 may be located at a lens application distance 7 from luminous display generator 1 (e.g., an LCD, an active matrix flat panel display, or a cathode ray tube, as shown). Fresnel lens 2 may be more economically fabricated with a molded plastic or resin, such as acrylic, but may also be formed with glass or other optical materials. Fresnel lens 2 has an outer viewing surface 4 and a curved inner surface 3 having a radius of curvature substantially matching the radius of curvature of the curved display surface 3 of the luminous display generator 1.

The lens application distance 7 with respect to luminous display generator 1 is related to the physical dimensions of the display surface of the luminous display generator 1. Fresnel lens 2 and the lens application distance 7 allow embodiments of the invention to achieve a depth of field and three-dimensional like effect in viewable video content.

In one embodiment, the use of a single molded Fresnel lens 2 in front of luminous display generator 1 creates a magnification factor of approximately 1.615. The magnification factor of Fresnel lens 2, with respect to display generator 1, results in a larger outer viewing surface 4 than the display surface of the luminous display generator 1.

Figure 3:
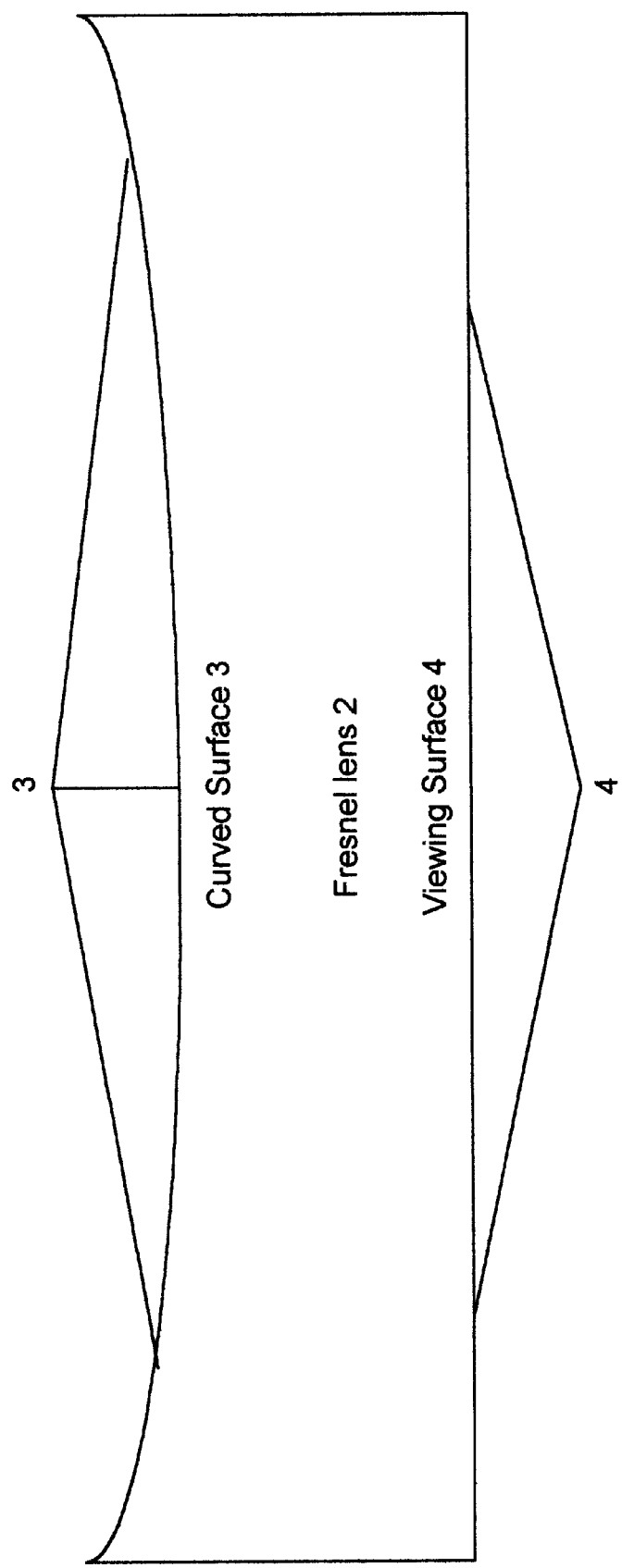
FIG. 3 is a diagram of a top view section detail of Fresnel lens, in accordance with one embodiment of the invention.

FIG. 3 is a diagram of a top view section detail of Fresnel lens 2, in accordance with one embodiment of the invention. In the embodiment shown in FIG. 2, Fresnel lens 2 includes a curved inner surface 3. The radius of curvature of the curved inner surface 3 of Fresnel lens 2 is designed to substantially match the radius of curvature of the display surface of luminous display generator 1. The matching of the radius of curvature of the two surfaces helps to maintain optical focus and clarity. Therefore, in some preferred embodiments, a curved inner surface is used on a Fresnel lens applied to a luminous display generator having a physically curved display surface. The opposite side of the curved inner surface 3 of the Fresnel lens 2 is a viewing outer surface 4, which in the embodiment shown in FIG. 3 is substantially flat.

Figure 4:
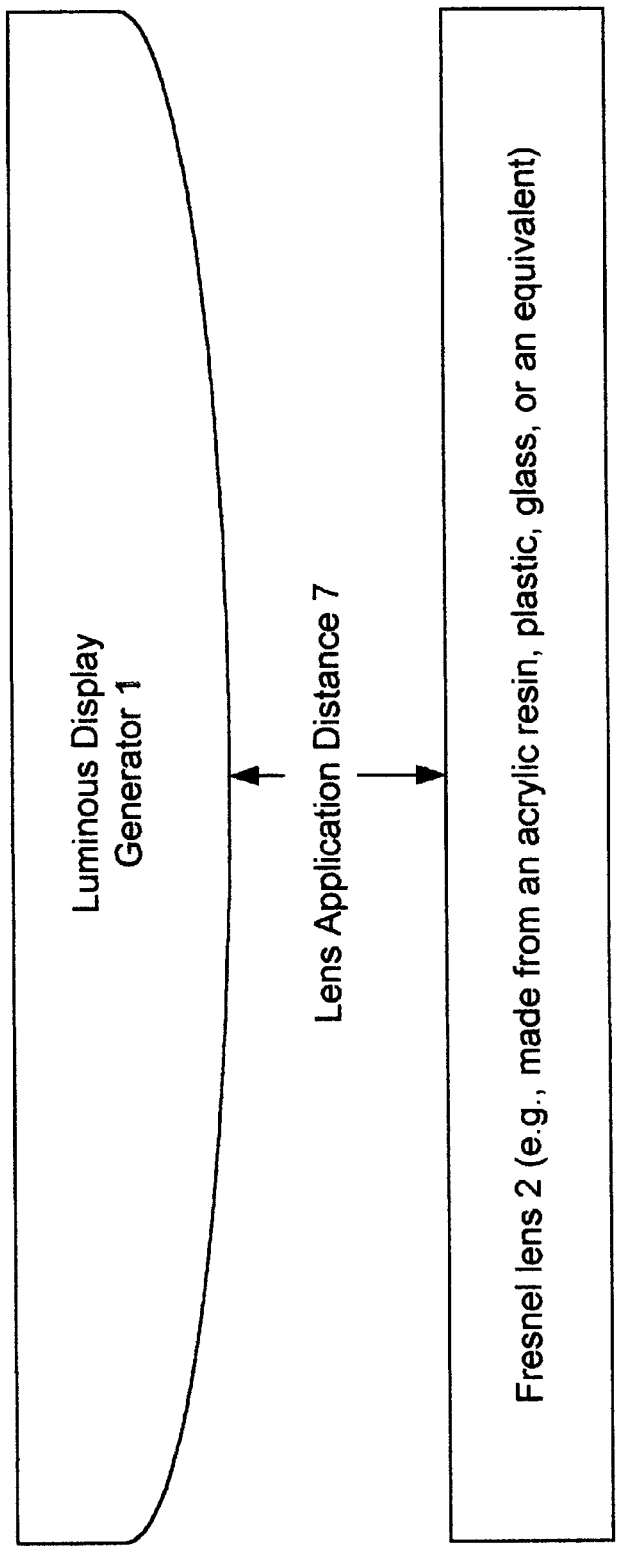
FIG. 4 is a diagram of a top view cross-section showing the lens application distance between Fresnel lens and the display surface of luminous display generator, in accordance with one embodiment of the invention.

FIG. 4 is a diagram of a top view cross-section showing the lens application distance 7 between Fresnel lens 2 and the display surface of luminous display generator 1, in accordance with one embodiment of the invention. The mathematical calculation to determine the lens application distance 7 is typically not simple due to differences in the physical dimensions and radius of curvature of the display surfaces of various luminous display generators. However, one approximation of the lens application distance 7 is the average diagonal dimension of the display surface of the luminous display generator divided by 3.386.

This application of the Fresnel lens 2 to a cathode ray tube in a format similar to a modern television or CRT housing is one application of a Fresnel lens 2. However, the Fresnel lens 2 application to a luminous display generator 1 is not limited to a cathode ray tube. A Fresnel lens 2 may be applied to various luminous display generators (e.g., displays) including, but not limited to, the following:

(A) A video graphics array (VGA) monitor and it's electronics for computer-generated subject matter, or a super video graphics array (SVGA), a thin film transistor (TFT) monitor, extended graphics array (XGA) monitor, or a high performance addressing (HPA) monitor;

(B) A liquid crystal display (LCD), a active matrix LCD, or other flat panel display units, regardless of size and operating systems;

(C) A plasma display, regardless of size and operating systems;

(D) A high definition television (HDTV) display; and (E) Video projection units, regardless of operating systems.

These display formats utilize a single Fresnel lens applied directly in front of the luminous display generator at a particular distance to achieve the desired depth of field and three-dimensional like effect on viewable video content.

The presentation format of one embodiment of the visual display apparatus can be packaged in a consumer format similar to modem television units, while not being limited to the following formats:

(A) VGA, SVGA, XGA, TFT, or HPA computer style monitor packaging;

(B) Flat panel style packaging;

(C) Projection style big screen television units;

(D) Commercial video arcade booths displaying video gaming content;

(E) Home video arcade booths displaying video gaming content or other video entertainment;

(F) Instructional video systems (e.g., flight simulators, military and law enforcement training, medical applications, or equivalent systems);

(G) Amusement simulators or rides that provide a sense of motion combined with video entertainment; and (H) Advertisement displays that utilize video or subject matter from a luminous display generator.

Figure 5:
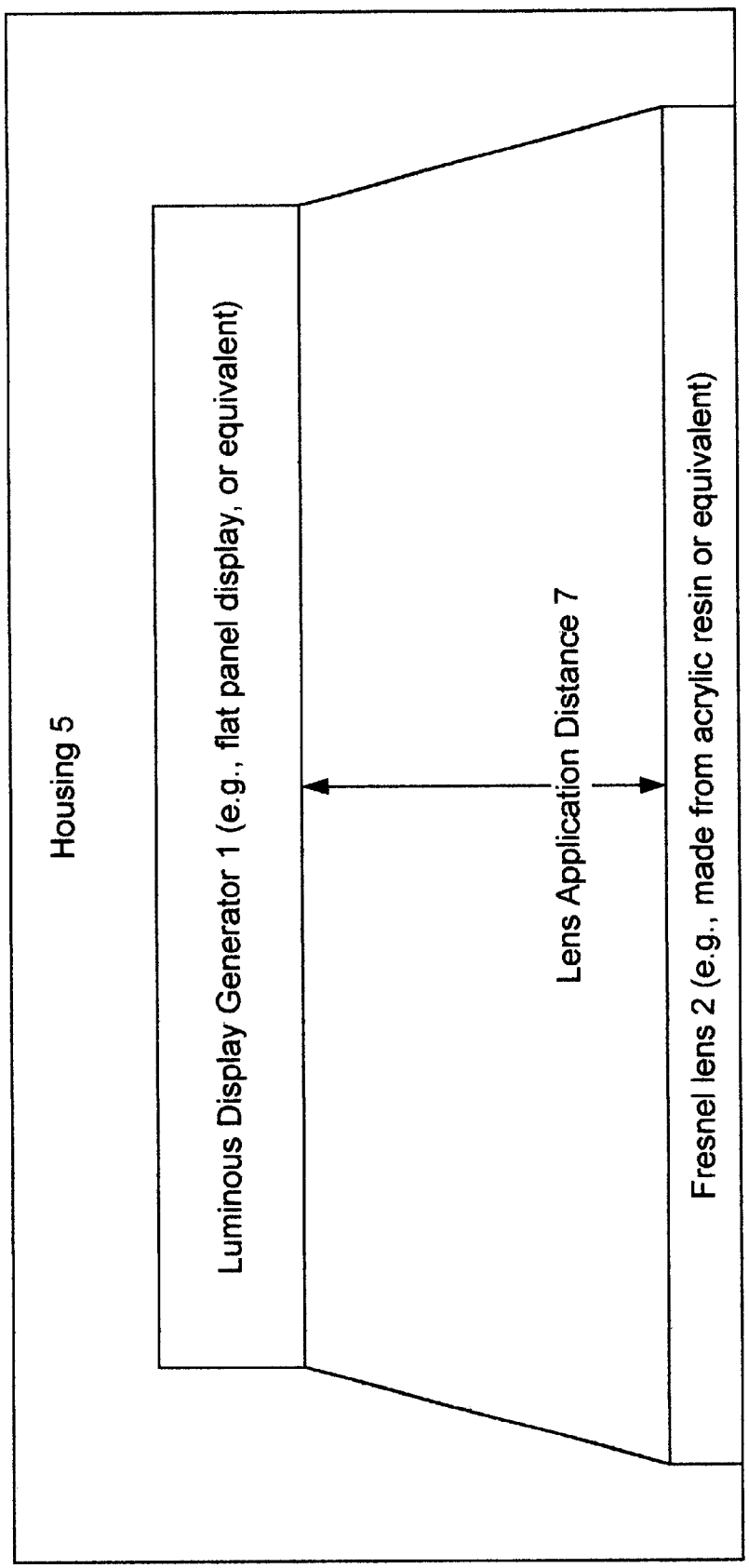
FIG. 5 is a top view illustrating internal features of a flat-panel display used as a luminous display generator, in accordance with another embodiment of the invention.

FIG. 5 is a top view illustrating internal features of a flat-panel display used as a luminous display generator 1, in accordance with another embodiment of the invention. The housing 5 positions a Fresnel lens 2 at a lens application distance 7 from the display surface of the luminous display generator 1. A flat screen luminous display generator 1 typically consumes less space than a CRT within housing 5, which allows a Fresnel lens with larger physical dimensions to be implemented within the housing 5.

Figure 6:
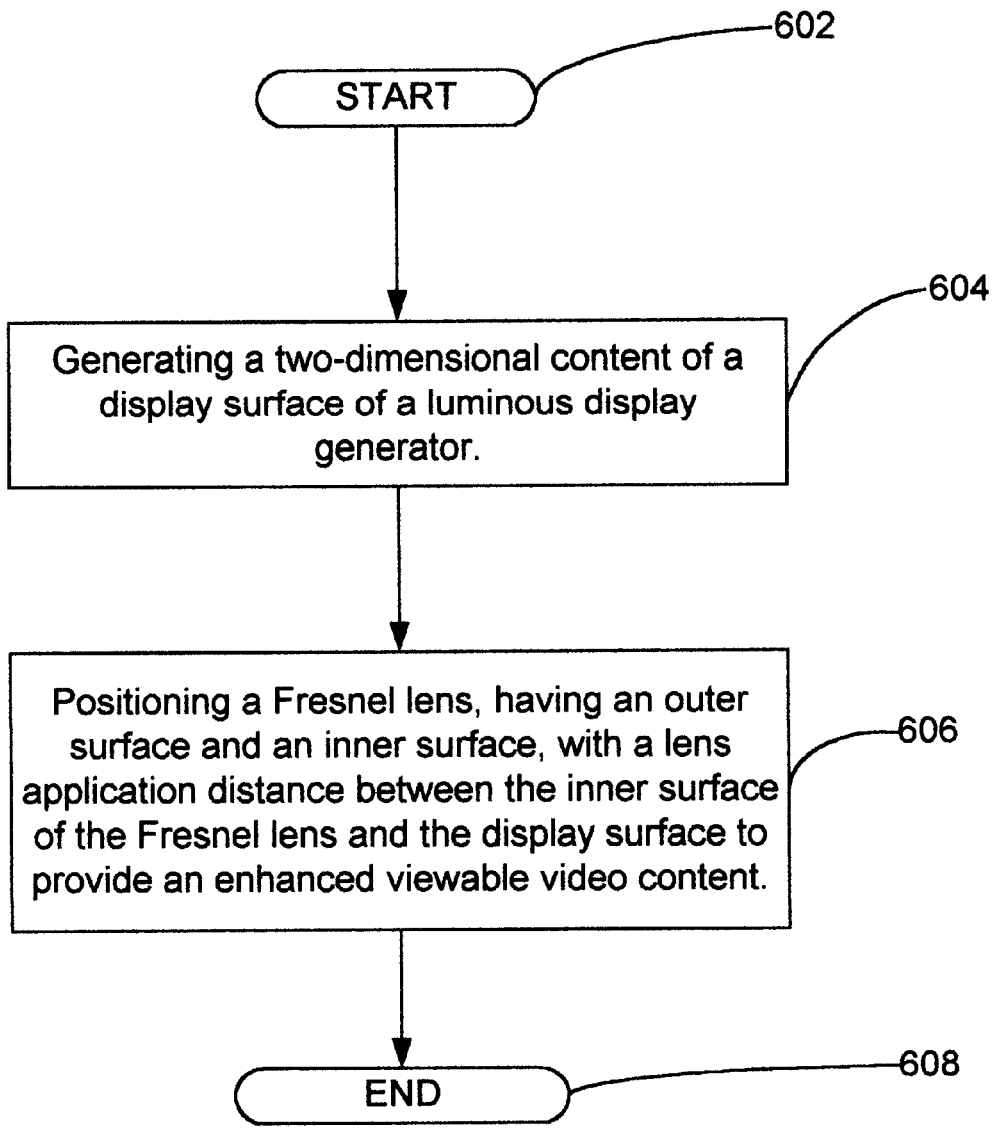
FIG. 6 is a flow chart to implement a visual display system, in accordance with one preferred embodiment of the invention.

FIG. 6 is a flow chart to implement a visual display system, in accordance with one preferred embodiment of the invention. The method starts in operation 602, and is followed by operation 604. Operation 604 includes generating a viewable video content on a display surface of a luminous display generator. Operation 606 is the next operation and includes positioning a Fresnel lens having an outer surface and an inner surface, with a lens application distance between the inner surface of the Fresnel lens and the display surface to provide an enhanced viewable video content Operation 608 is the end of the method.

Figure 7:
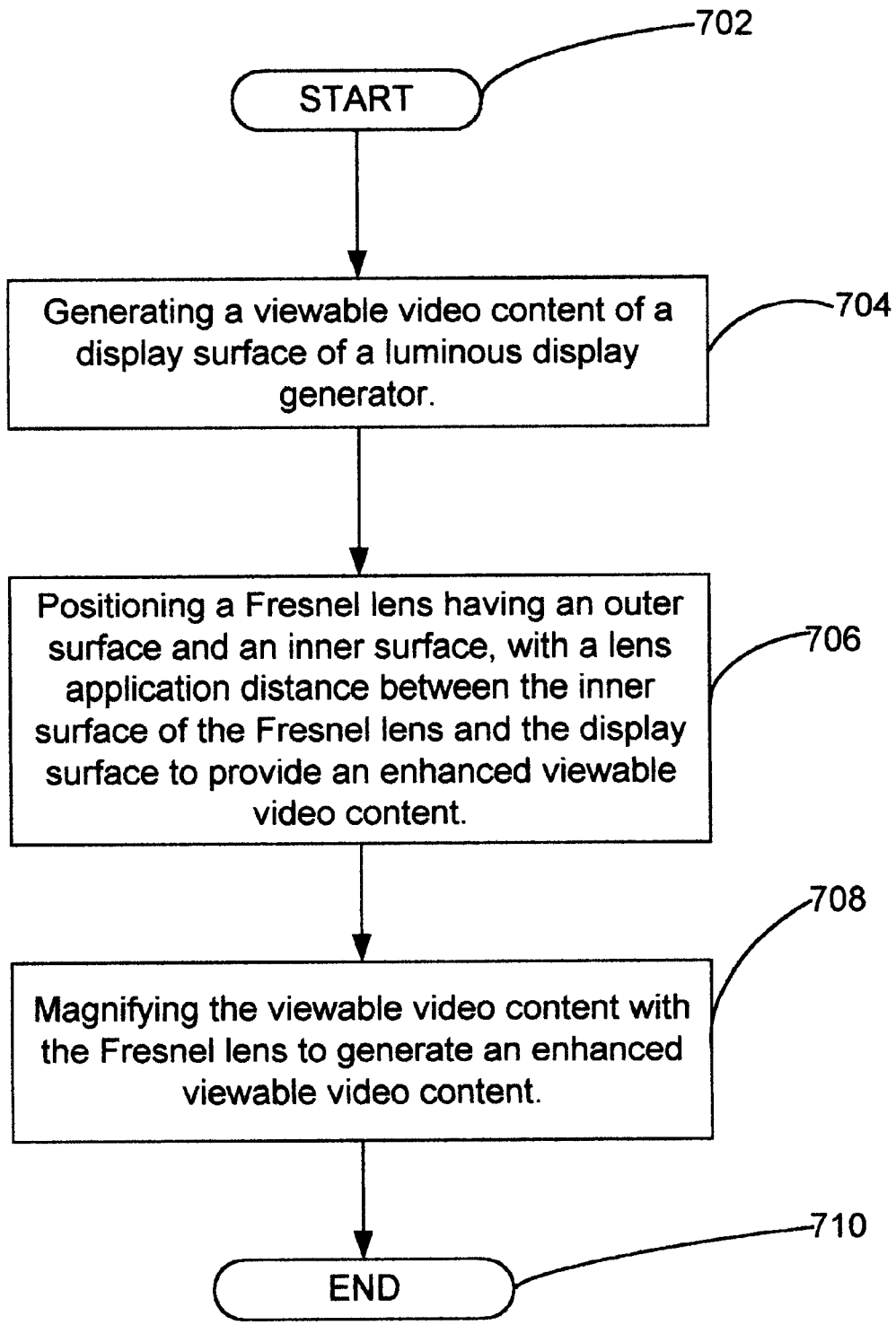
FIG. 7 is a flow chart to implement a visual display system, in accordance with another preferred embodiment of the invention.

FIG. 7 is a flow chart to implement a visual display system, in accordance with another preferred embodiment of the invention. The method starts in operation 702, and is followed by operation 704. Operation 704 includes generating a viewable video content on a display surface of a luminous display generator. Operation 706 is the next operation and includes positioning a Fresnel lens having an outer surface and an inner surface, with a lens application distance between the inner surface of the Fresnel lens and the display surface to provide an enhanced viewable video content. Operation 708 is the next operation and includes magnifying the viewable video content with the Fresnel lens to generate an enhanced viewable video content. The lens application distance is less than the focal length of the Fresnel lens, but the Fresnel lens preferably still provides some magnification. Operation 710 is the end of the method.

Figure 8:
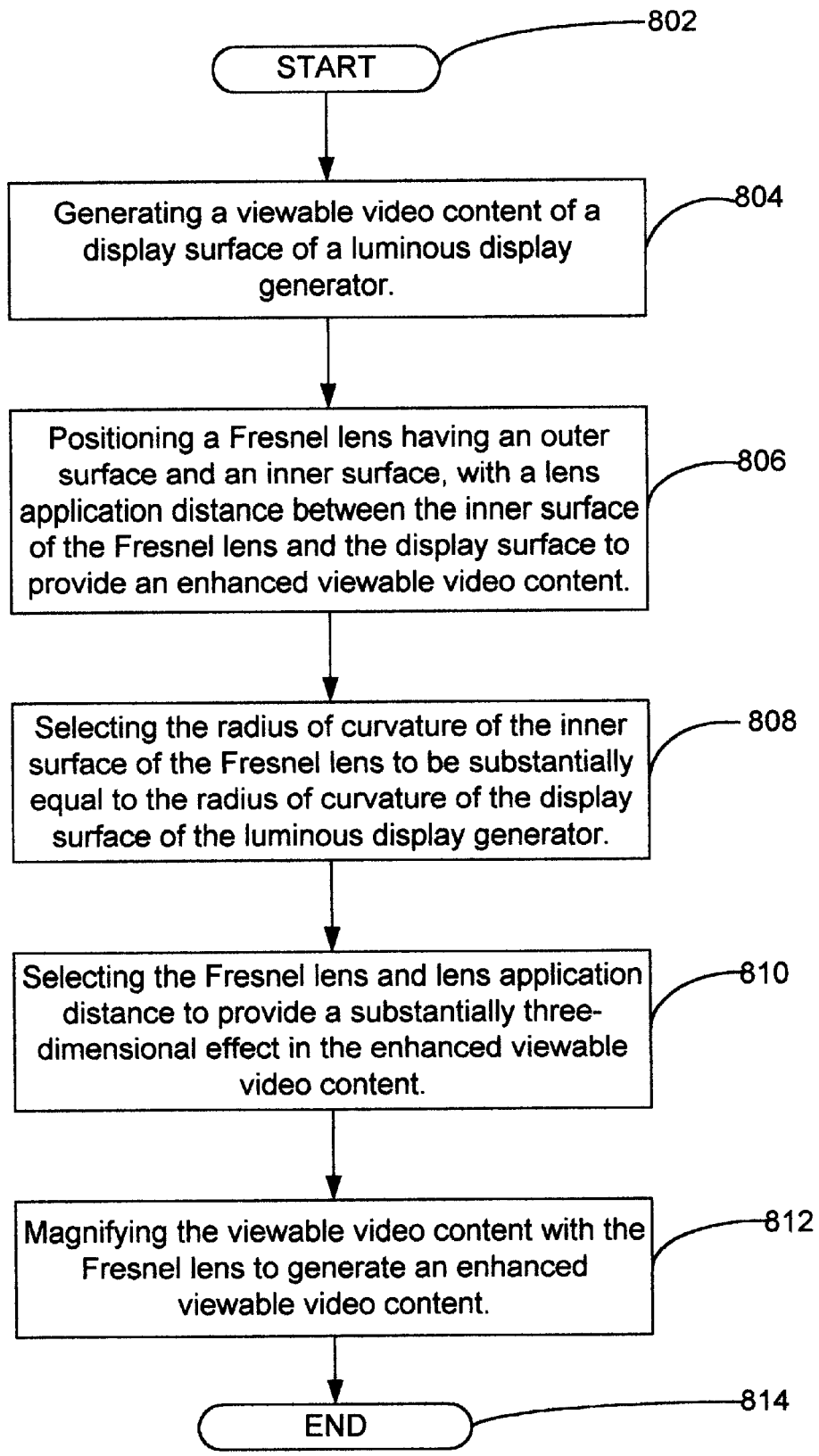
FIG. 8 is a flow chart to implement a visual display system, in accordance with another preferred embodiment of the invention.

FIG. 8 is a flow chart to implement a visual display system, in accordance with another preferred embodiment of the invention. The method starts in operation 802, and is followed by operation 804. Operation 804 includes generating a viewable video content on a display surface of a luminous display generator. Operation 806 is the next operation and includes positioning a Fresnel lens having an outer surface and an inner surface, with a lens application distance between the inner surface of the Fresnel lens and the display surface to provide an enhanced viewable video content. Operation 808 is the next operation and includes selecting the radius of curvature of the inner surface of the Fresnel lens to be substantially equal to the radius of curvature of the display surface of the luminous display generator. Operation 810 is the next operation and includes selecting the Fresnel lens and lens application distance to provide a substantially three-dimensional effect in the enhanced viewable video content. Operation 812 is the next operation and includes magnifying the viewable video content with the Fresnel lens to generate an enhanced viewable video content. Operation 814 is the end of the method.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments illustrated herein but is to be accorded the widest scope consistent with the principles and novel features disclosed herein, and as defined by the following claims.

What is claimed is:

1. An apparatus to produce a substantially three-dimensional effect on viewable video content comprising:

a luminous display generator having a display surface, configured to provide a viewable video content on said display surface; and a Fresnel lens having an inner surface and an outer surface, said Fresnel lens positioned at a lens application distance from said display surface of said luminous display generator, wherein said Fresnel lens is dimensioned and positioned at said lens application distance solely sufficient to provide a substantially three-dimensional effect on said viewable video content provided on said display surface of said luminous display generator, said lens application distance between said Fresnel lens and said display surface of said luminous display generator is related to a physical dimension of said display surface, and said lens application distance is substantially equal to a diagonal physical dimension of said display surface divided by approximately 3.38.

2. A method to implement a visual display system to provide a substantially three-dimensional effect on viewable video content, comprising:

generating a viewable video content on a display surface of a luminous display generator; and positioning a Fresnel lens having an outer surface and an inner surface with a lens application distance between said inner surface of said Fresnel lens and said display surface solely sufficient to provide a substantially three-dimensional effect on said viewable video content, wherein said display surface has a diagonal length and said lens application distance is substantially equal to said diagonal length divided by 3.38.

3. A method to implement a visual display system to provide a substantially three-dimensional effect on viewable video content, comprising:

generating a two-dimensional viewable video content on a display surface of a luminous display generator;

positioning a Fresnel lens having an outer surface and an inner surface with a lens application distance between said inner surface of said Fresnel lens and said display surface, wherein said lens application distance between said Fresnel lens and said display surface of said luminous display generator is related to a physical dimension of said display surface; and said Fresnel lens and said lens application distance are sufficient to provide a substantially three-dimensional effect on said viewable video content; and selecting said Fresnel lens and said lens application distance to provide said substantially three-dimensional effect for said viewable video content, wherein said display surface has a diagonal length and said physical dimension of said display surface is said diagonal length and said lens application distance is substantially equal to said diagonal length divided by 3.38.

\* \* \* \* \*